US006823250B2

(12) United States Patent
Yamaguchi et al.

(10) Patent No.: US 6,823,250 B2
(45) Date of Patent: Nov. 23, 2004

(54) VEHICULAR POWER-TRANSMISSION CONTROL SYSTEM

(75) Inventors: Masaaki Yamaguchi, Wako (JP);
Takahiro Eguchi, Wako (JP); Daihei Teshima, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/303,251

(22) Filed: Nov. 25, 2002

(65) Prior Publication Data

US 2003/0109969 A1 Jun. 12, 2003

(30) Foreign Application Priority Data

Dec. 10, 2001 (JP) ........................................ 2001-375646

(51) Int. Cl.[7] .............................. B60L 11/00; G06F 7/00
(52) U.S. Cl. ........................................... 701/51; 701/22
(58) Field of Search ............................. 701/22, 51, 54, 701/61; 180/65.1, 65.2, 65.3, 65.4, 165

(56) References Cited

U.S. PATENT DOCUMENTS

| | | | | |
|---|---|---|---|---|
| 4,733,580 A | * | 3/1988 | Kubo et al. | .................. 477/129 |
| 5,839,533 A | * | 11/1998 | Mikami et al. | .............. 180/165 |
| 6,671,601 B2 | * | 12/2003 | Abiru | ........................... 701/51 |

* cited by examiner

Primary Examiner—Yonel Beaulieu
(74) Attorney, Agent, or Firm—Fish & Richardson P.C.

(57) ABSTRACT

A vehicular power-transmission control system transmits the rotational driving forces of an engine E and an electrical motor generator M through a continuously variable transmission CVT to wheels by controlling the speed change ratio of the continuously variable transmission CVT in correspondence to the operational condition of the vehicle. Additionally, the control system corrects the speed change ratio of the transmission in correspondence to the difference between the actual output of the electrical motor generator and the requested output of the electrical motor generator that is set correspondingly to the speed of the vehicle.

6 Claims, 5 Drawing Sheets

VEHICULAR POWER-TRANSMISSION CONTROL SYSTEM

FIELD OF THE INVENTION

The present invention relates generally to a vehicular power transmission control system equipped with an engine and an electrical motor generator to drive a vehicle and particularly to a control system that executes an automatic speed-ratio change of an automatic transmission, through which the rotational driving forces of the engine and the electrical motor generator are transmitted to drive wheels.

BACKGROUND OF THE INVENTION

Recently, a vehicle equipped with a so-called hybrid-type drive source, i.e., an electrical motor generator in addition to an engine, has been developed and come into practical use. In such a hybrid vehicle, generally, the engine and the electrical motor generator are used to drive the vehicle in a most fuel-efficient way, and while the vehicle is in a deceleration, the electrical motor generator, which is driven by a driving force of the drive wheels, is used to generate electricity for charging the battery (recovering energy). As a result, such a vehicle has achieved a high fuel efficiency. However, in a case where the electrical motor generator is used for driving the drive wheels, if the charge of the battery is insufficient, the electrical motor generator cannot provide a driving torque that is necessary for driving the vehicle. To solve this problem, conventionally, the speed change ratio of the transmission is controlled to shift toward the LOW speed ratio in correspondence to the remaining charge of the battery.

Even though the charge of the battery is sufficient enough to drive the electrical motor generator, there is an occasion where the electrical motor generator cannot provide a required or predetermined output. This can happen, for example, if the temperature of the battery or the electrical motor generator becomes too low or too high to operate in good condition or if the electrical motor generator malfunctions. If the electrical motor generator experiences such a problem, for example, while the vehicle is traveling downhill, the torque driving the electrical motor generator for recovering energy (referred to as "recovery torque") may become small enough to weaken the action of engine brake provided by the electrical motor generator. Another problem may be a worsening of the acceleration performance of the vehicle.

SUMMARY OF THE INVENTION

It is an object of the present invention to provide a power-transmission control system for a vehicle, which system can provide securely a predetermined engine brake or a predetermined acceleration performance even in a case where the electrical motor generator fails to perform an initial or intended performance.

To achieve this objective, the present invention provides a vehicular power-transmission control system that transmits the rotational driving forces of an engine and an electrical motor generator to drive wheels through an automatic transmission (for example, the continuously variable transmission CVT described in the following embodiment) by controlling the speed change ratio of the automatic transmission in correspondence to the operational condition of the vehicle. Additionally, the control system corrects the speed change ratio of the transmission in correspondence to the difference between the actual output of the electrical motor generator and the requested output of the electrical motor generator that is set correspondingly to the operational condition of the vehicle.

In a case where the battery is not charged sufficiently or the electrical motor generator cannot perform as expected even though the battery is charged sufficiently, the actual output of the electrical motor generator falls short of the requested output of the electrical motor generator. To solve such a problem, the vehicular power-transmission control system according to the present invention corrects the speed change ratio in correspondence to the difference between the actual output and the requested output. For example, in a case where the vehicle is traveling downhill with an engine brake being activated, if the actual output of the electrical motor generator (electrical power for recovering energy) falls short, then the force of the engine brake becomes small. To solve such a problem, the speed change ratio of the transmission is corrected (generally toward the LOW speed ratio) in correspondence to the difference between the actual output and the requested output to increase the rotational speeds of the electrical motor generator and the engine. This action results in an increase in the force of the engine brake and eliminates the insufficiency in the braking force. In another case where during an acceleration of the vehicle, if the actual output of the electrical motor generator (electrical power for acceleration) falls short, the speed change ratio is also corrected (also toward the LOW speed ratio) in correspondence to the difference between the actual output and the requested output. This action results in an increase in the driving torque, eliminating the insufficiency in the driving torque.

Preferably, the automatic transmission comprises a continuously variable transmission, and the target engine rotational speed is set in correspondence to the operational condition of the vehicle (for example, the vehicle speed and the accelerator opening), so that the speed change ratio of the continuously variable transmission is controlled to bring the rotational speed of the engine to the target engine rotational speed. In this case, the target engine rotational speed is corrected to correct the speed change ratio in correspondence to the difference between the actual output and the requested output of the electrical motor generator.

It is preferable that the vehicular power transmission control system further comprise inclination-detecting means for detecting the inclination of the road surface where the vehicle is traveling (for example, the inclination sensor described in the following embodiment) and that the speed change ratio be corrected in correspondence to the difference between the actual output of the electrical motor generator, which is being driven by a force from the wheels, and the requested output of the electrical motor generator that is set correspondingly to the current vehicle speed. By this control, any insufficiency which may occur in the output of the electrical motor generator is compensated as the correction of the speed change ratio functions to increase the rotational speeds of the electrical motor generator and the engine, generating a force to eliminate the insufficiency in the engine-braking action.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
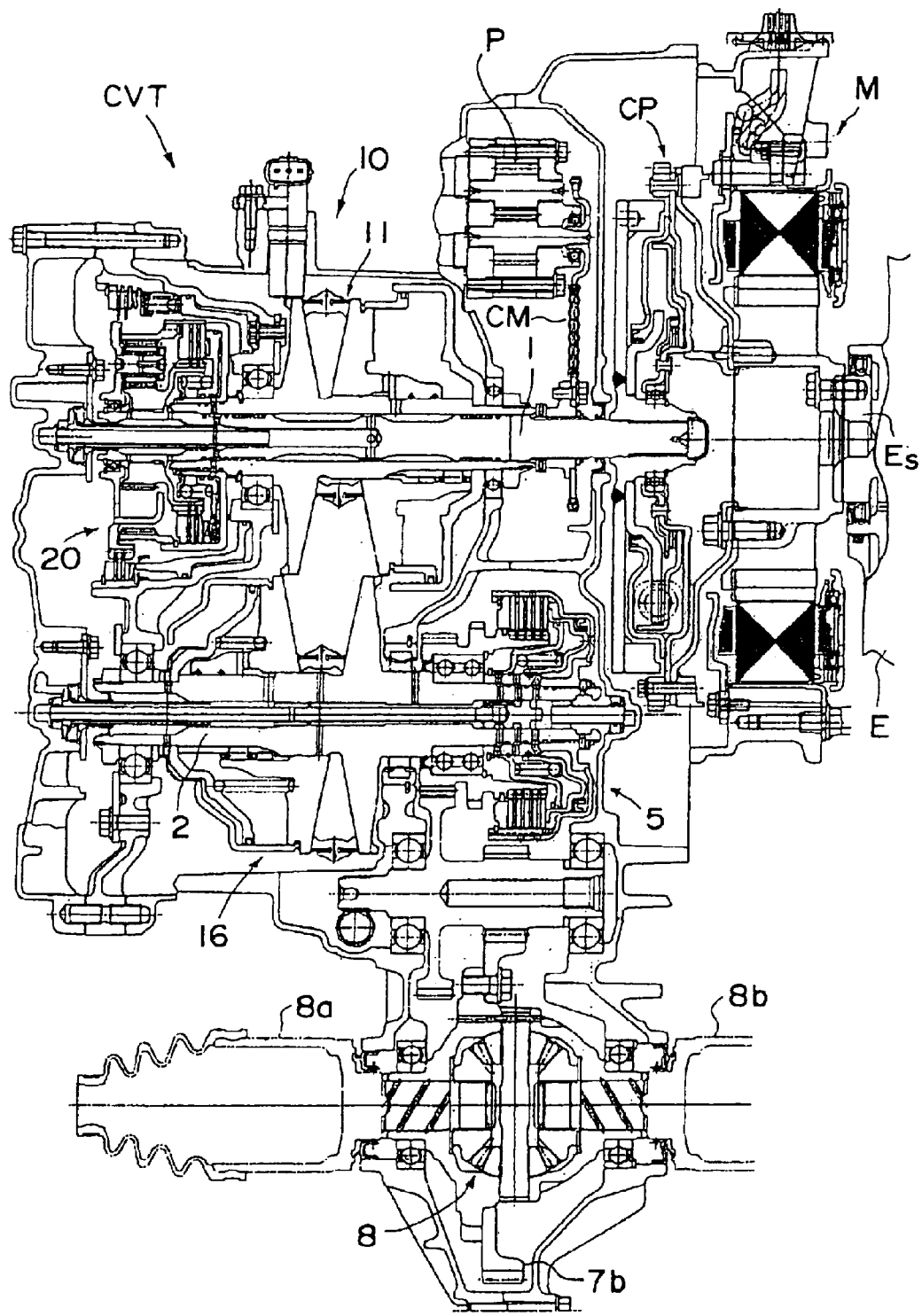
FIG. 1 is a sectional view describing the construction of a power transmission, which is controlled by a control system according to the present invention.
Figure 2:
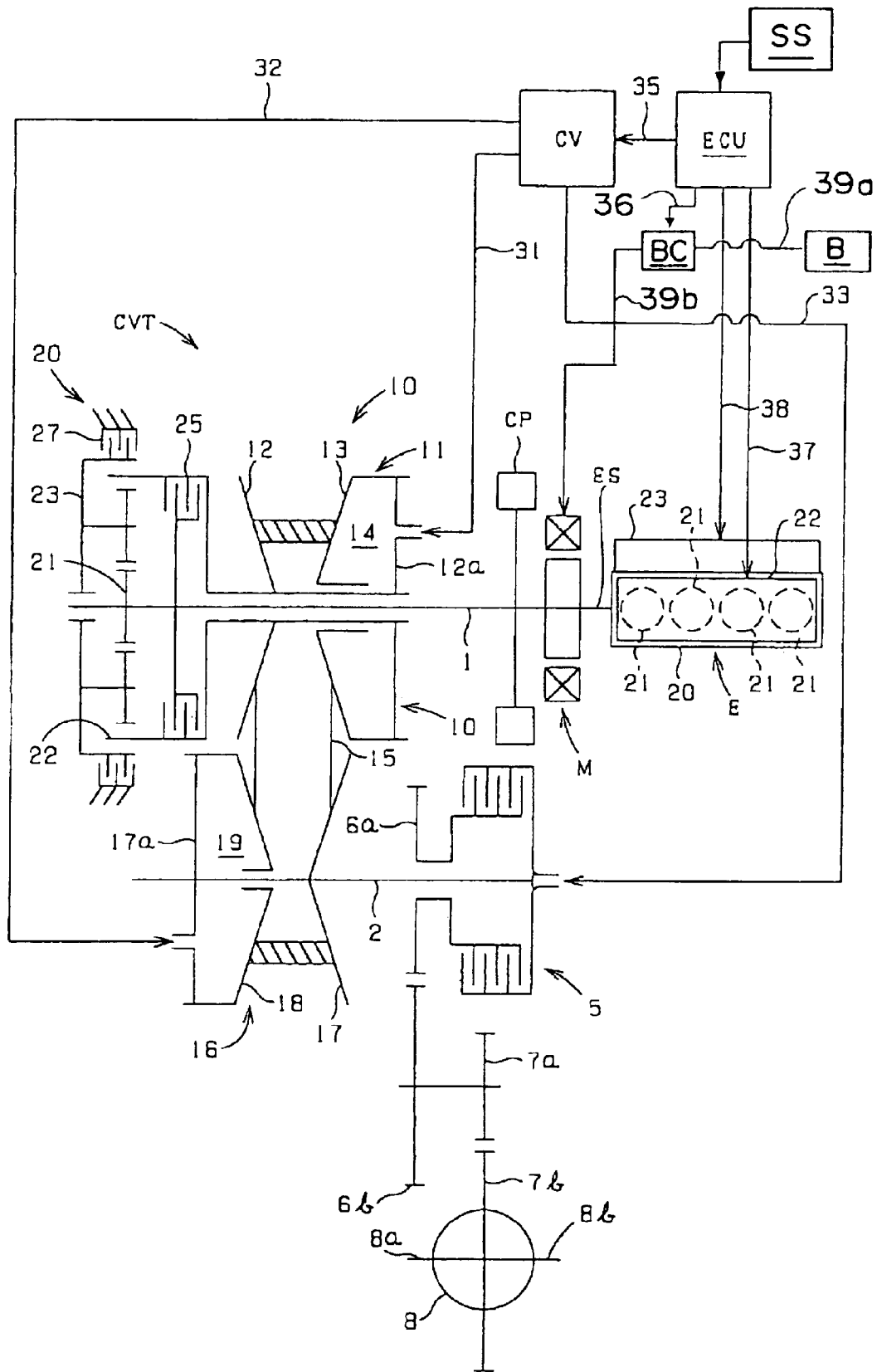
FIG. 2 is a schematic diagram describing the power transmission system of the power transmission.

A preferred embodiment according to the present invention is described in reference to the drawings. FIG. 1 is a sectional view describing the construction of a power transmission used for a vehicle, which power transmission is controlled by a control system according to the present invention. FIG. 2 shows schematically the power transmission system of this power transmission. It is clear from these drawings that this power transmission comprises an engine E, an electrical motor generator M, which is connected to the output shaft Es of the engine E, and a continuously variable transmission CVT, which is connected through a coupling mechanism CP to the output shaft Es of the engine.

The engine E is a four cylinder reciprocating engine and has a piston in each of the four cylinder bores 21 formed in a cylinder block 20. The engine E is also equipped with a suction and exhaust controller 22, which controls the operation of the suction valves and the exhaust valves for each cylinder bore 21, and with a fuel injection and ignition controller 23, which controls the injection of fuel and the ignition for each cylinder bore 21.

The electrical motor generator M can assist the driving force of the engine when the electrical motor generator M is powered through power supply lines 39a and 39b by a battery B incorporated in the vehicle, and it can charge the battery B by generating electricity from the rotational drive received from the wheel side while the vehicle is in a deceleration (energy recovery). Thus, this power transmission has a hybrid-type drive source with a battery controller BC controlling these power supply control and energy recovery control (charging control). The electrical current powering the electrical motor generator through the battery controller BC and the electrical current being generated by the electrical motor generator M charging the battery B are detected and monitored by the electrical control unit ECU, which is connected to the battery controller BC through a line 36.

The continuously variable transmission CVT comprises a metal V-belt mechanism 10, a forward/reverse switching mechanism 20 and a starting clutch (main clutch) 5. The metal V-belt mechanism 10 is disposed around the input shaft 1 and the countershaft 2 of the transmission, the forward/reverse switching mechanism 20 is disposed over the input shaft 1, and the starting clutch 5 is disposed on the countershaft 2. This continuously variable transmission CVT is mounted on a vehicle, and the input shaft 1 is connected through a coupling mechanism CP with the output shaft Es of the engine. The driving force output from the transmission is transmitted through the starting clutch 5 to a differential mechanism 8 and then through right and left driving axle shafts 8a and 8b to right and left wheels (not shown). In addition, a hydraulic pump P is provided in the transmission housing and is connected to the input shaft 1 through a chain mechanism CM. Therefore, the hydraulic pump P is driven by the input shaft 1, which rotates at the same rotational speed as the output shaft Es of the engine, so that oil is supplied to a control valve CV as described in detail later in this section.

The metal V-belt mechanism 10 comprises a variable width drive pulley 11, which is disposed over the input shaft 1, a variable width driven pulley 16, which is disposed on the countershaft 2, and a metal V-belt 15, which is disposed around these pulleys 11 and 16. The drive pulley 11 comprises a stationary pulley half 12, which is disposed rotatably on the input shaft 1, and a movable pulley half 13, which is movable with respect to the stationary pulley half 12 in the axial direction of the pulley 11. On the lateral outside of the movable pulley half 13, a drive-pulley cylinder chamber 14 is defined by a cylinder wall 12a, and a pulley-control pressure supplied through the control valve CV and through an oil passage 31 into the drive-pulley cylinder chamber 14 generates a thrust which shifts the movable pulley half 13 in the axial direction of the drive pulley.

The driven pulley 16 comprises a stationary pulley half 17, which is fixed on the countershaft 2, and a movable pulley half 18, which is movable with respect to the stationary pulley half 17 in the axial direction of the pulley. On the lateral outside of the movable pulley half 18, a driven-pulley cylinder chamber 19 is defined by a cylinder wall 17a, and a pulley-control pressure supplied through the control valve CV and through an oil passage 32 into the driven-pulley cylinder chamber 19 generates a thrust which shifts the movable pulley half 18 in the axial direction of the driven pulley.

In this construction, the hydraulic pressures being supplied into these cylinder chambers 14 and 19 of the drive and driven pulleys, respectively, are controlled by the control valve CV to generate appropriate lateral thrusts in these two pulleys, so that there will be no slip of the belt 15. Furthermore, these pressures supplied into the cylinder chambers are controlled to create a difference between these lateral thrusts, so that the groove widths of these pulleys will change to adjust the pitch radii of the respective pulleys for the V belt 15. In this way, the speed change ratio of the transmission is controlled to vary continuously without any step. These lateral thrusts, which are generated in the drive and driven pulleys for the speed change ratio control, are generated from a line pressure that is adjusted by a regulator valve from the pressure of the hydraulic pump P, which is connected to the input shaft 1 through the chain mechanism CM. More specifically, the pressure of either the drive or driven cylinder chamber that is the higher of the two is produced from the line pressure.

The forward/reverse switching mechanism 20 is a planetary gear train, which comprises a sun gear 21, a ring gear 22, a carrier 23 and a forward clutch 25. The sun gear 21 is connected to the input shaft 1, and the ring gear 22 is connected to the stationary pulley half 12 of the drive pulley 11. The carrier 23 can be held against rotation by a reverse brake 27, and the forward clutch 25 can be operated to connect the sun gear 21 with the ring gear 22. In this mechanism 20, when the forward clutch 25 is engaged, all the gears 21, 22 and 23 rotate together with the input shaft 1 as a one body, and the drive pulley 11 is driven by the driving force of the engine E in the same direction as the input shaft 1 (i.e., in the forward direction of the vehicle). On the other hand, when the reverse brake 27 is engaged, the carrier 23 is held stationary, so the ring gear 22 rotates in the direction opposite to that of the sun gear 21, and the drive pulley 11 is driven by the driving force of the engine E in the direction opposite to that of the input shaft 1 (i.e., in the reverse direction). The engagement operation of the forward clutch 25 and the reverse brake 27 is controlled with a forward/reverse control pressure that is adjusted by the control valve CV from the line pressure.

The starting clutch 5 is a clutch to control the power transmission between the countershaft 2 and the output members of the transmission, i.e., power transmission gears 6a, 6b, 7a and 7b. In the condition where the starting clutch 5 is engaged connecting the countershaft to the power transmission gears, the output of the engine, after undergoing the speed ratio change by the metal V-belt mechanism 10, is transmitted through the gears 6a, 6b, 7a and 7b to the differential mechanism 8 and then divided and transmitted by the differential mechanism 8 to the right and left axle shafts 8a and 8b and then to the right and left drive wheels. When the starting clutch 5 is released or disengaged, this power transmission is terminated, so the transmission is in neutral condition. The engagement of the starting clutch 5 is controlled with a clutch-control pressure that is adjusted by the control valve CV from the line pressure and supplied through an oil passage 33.

In this continuously variable transmission CVT, as described above, the pulley-control pressures supplied to the drive and driven pulleys from the control valve CV through the oil passages 31 and 32, respectively, are used for the speed ratio change control while the forward/reverse control pressure supplied to the forward clutch 25 and the reverse brake 27 from the control valve CV through an oil passage (not shown) is used for the forward/reverse switching control of the transmission. In addition, the clutch-control pressure supplied from the control valve CV through the oil passage 33 is used for the starting clutch engagement control. For controlling these control pressures, the operation of the control valve CV, which receives oil from the hydraulic pump P, is controlled by means of control signals sent from an electrical control unit ECU.

In a condition where either the forward clutch 25 or the reverse brake 27 is engaged, the transmission of the rotational driving forces of the engine E and the electrical motor generator M to the drive wheels can be controlled by controlling the engaging action of the starting clutch 5. Conversely, in a condition where the starting clutch 5 is engaged, either the forward clutch 25 or the reverse brake 27 can be controlled to transmit the driving forces, achieving the same effect.

In the vehicle incorporating this transmission, the electrical motor generator M assists the driving force of the engine E, so that the engine E can operate in a range which is most fuel efficient. To further improve the fuel efficiency of the vehicle, the electrical motor generator M generates electricity to recover energy exploiting a rotational force received from the drive wheels during the deceleration of the vehicle. Especially while the brake is being operated to restrict the drive wheels during the deceleration, the electrical motor generator M functions to recover a large amount of energy. Simultaneously, it assists the braking force by applying the torque of the energy recovery as a decelerating torque. The operation of the electrical motor generator M for these driving assistance and energy recovery is controlled by the battery controller BC, which receives control signals sent from the electrical control unit ECU through a control line 36. In tandem with the operational control of the electrical motor generator M, the speed ratio change control is performed to achieve an optimal speed change ratio for the transmission, so that the engine E can operate in a most fuel efficient range. This control is also executed by means of control signals sent from the electrical control unit ECU through a control line 35 to the control valve CV In addition, the power-transmission control system is equipped with an inclination sensor SS, which is used to detect the inclination of the road surface while the vehicle is traveling. Signals for this detection are transmitted to the electrical control unit ECU.

Furthermore, the engine E can be operated in a partial cylinder operation mode where some of the four cylinders are set in a stand-by condition when a predetermined condition is satisfied for the vehicle (for example, in a deceleration). More specifically, while the electrical control unit ECU controls the operation of the suction and exhaust controller 22 with control signals sent through a control line 37 and the operation of the fuel injection and ignition controller 23 through a control line 38, to operate the engine in a partial cylinder operation mode, it keeps suction and exhaust valves being closed for some or all the cylinder bores 21 and inhibits these cylinders from receiving fuel injection and ignition. By operating the engine in this way, the fuel efficiency of the vehicle is improved especially during the vehicle's deceleration. In addition, the force of engine brake is made relatively small, so that the energy spent for the deceleration is recovered effectively by the electrical motor generator M.

Figure 3:
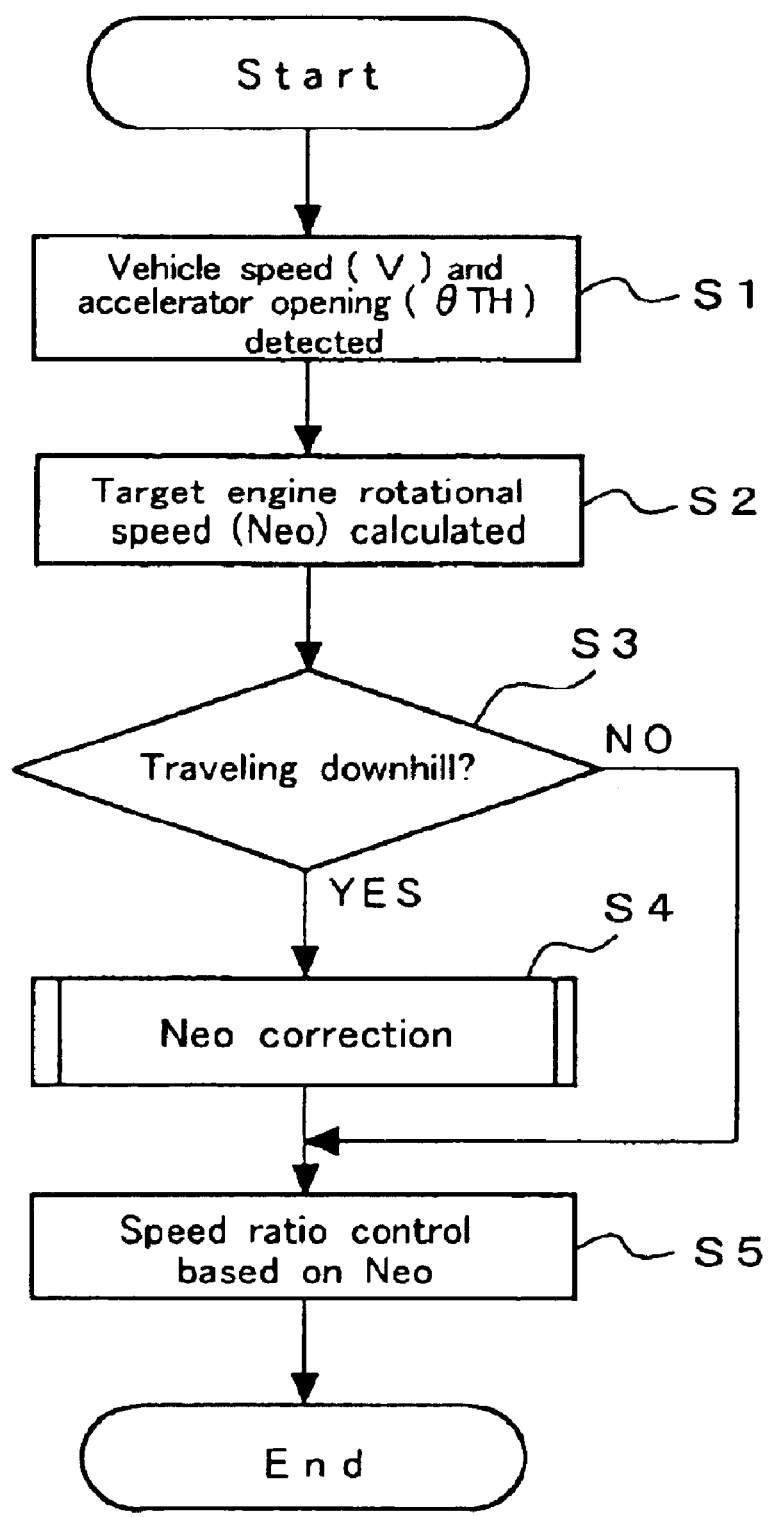
FIG. 3 is a flowchart describing control steps executed by the power-transmission control system according to the present invention.
Figure 4:
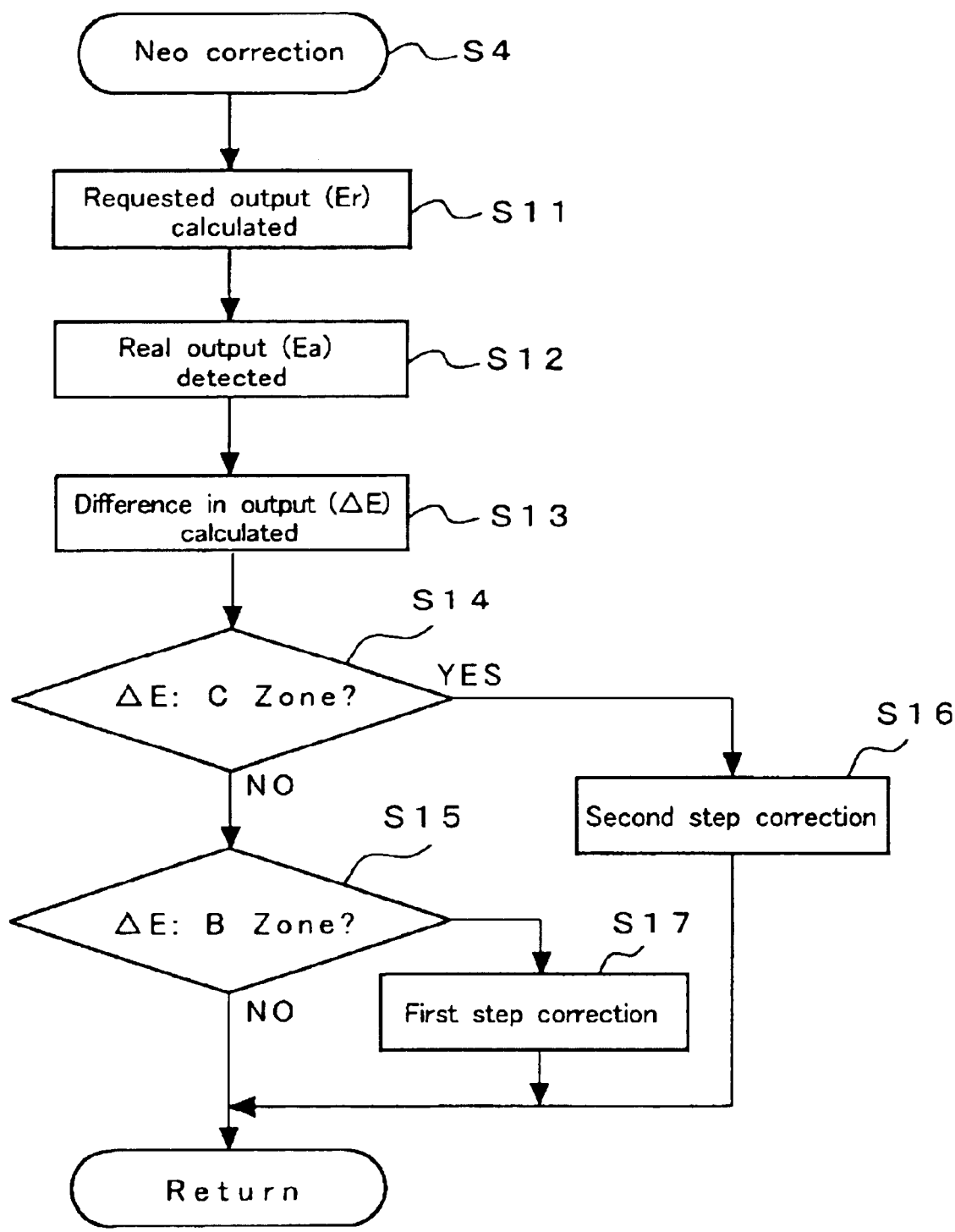
FIG. 4 is a flowchart describing control steps executed for correcting the target engine rotational speed Neo in the control shown in FIG. 3.
Figure 5:
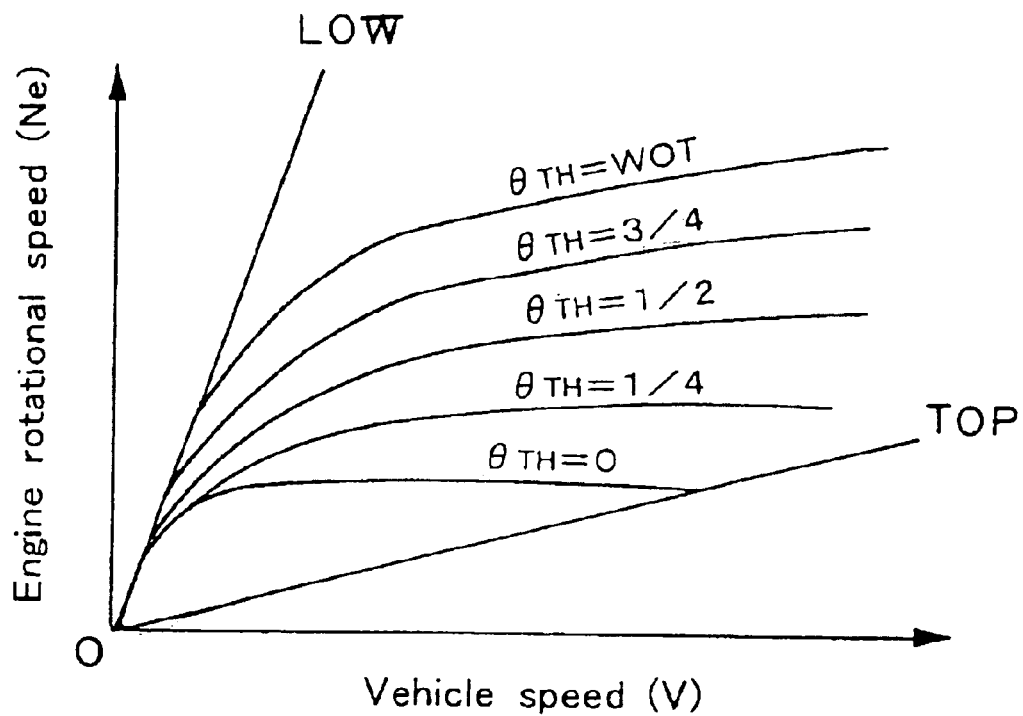
FIG. 5 is a graph showing values for the target engine rotational speed, which is determined in relation to the vehicle speed V and to the accelerator opening θTH.

Now, the speed ratio control of the continuously variable transmission CVT in this power transmission is described in reference to the flowcharts of FIGS. 3 and 4. In this control, at first, detections are made for the vehicle speed V and the accelerator opening θTH at Step S1. Here, the accelerator opening θTH is an indication of the pressed-down amount of the accelerator pedal and the degree of the opening of the engine throttle. Then, a target engine rotational speed Neo is calculated in correspondence to these detected values at Step S2. In this calculation, for example, a value is read in from the values of the target engine rotational speed Neo that are predetermined against possible values of the vehicle speed V and the accelerator opening θTH as described in the graph of FIG. 5.

In general, the speed change ratio of the continuously variable transmission CVT is controlled to achieve the target engine rotational speed Neo, which is calculated in the above described way. According to the present invention, if the vehicle is traveling downhill, i.e., on a road surface inclined downward, then the target engine rotational speed Neo is corrected in correspondence to the output power of the electrical motor generator M (energy recovery output). In this correction, a determination is made from detection signals received from the inclination sensor SS whether or not the vehicle is traveling downhill at Step S3. If the result of the determination is that the vehicle is traveling downhill (for example, the inclination of the road surface is equal to or greater than a predetermined inclination), then the control flow proceeds to Step S4, where the target engine rotational speed Neo is corrected.

Figure 6:
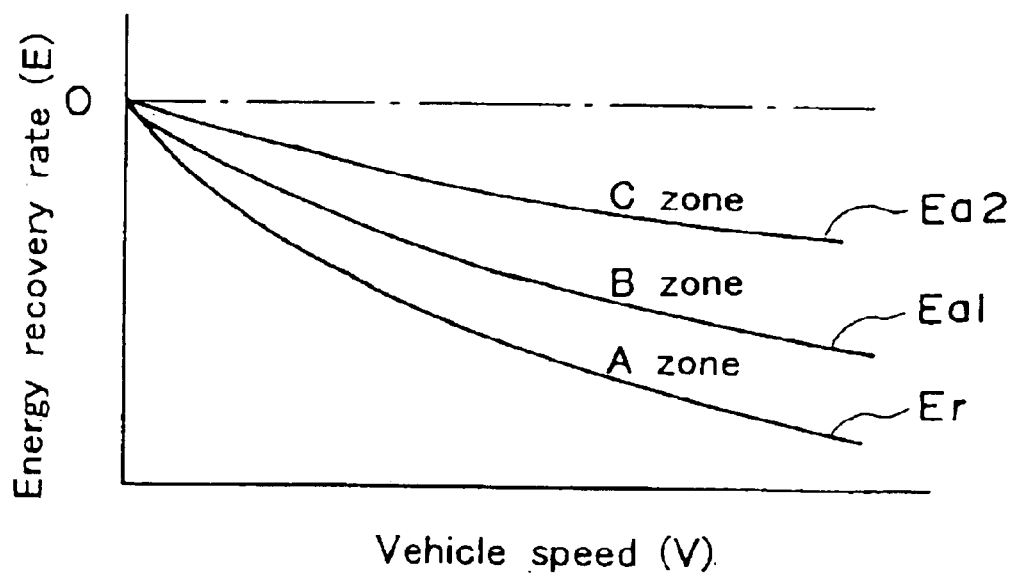
FIG. 6 is a graph showing values for the rate of energy recovery, which corresponds to the vehicle speed.

Now, the control to correct the target engine rotational speed Neo is described in reference to FIG. 4, which shows steps executed for this correction in detail. Here, at first, a calculation is made for the requested output Er of the electrical motor generator M in correspondence to the traveling condition of the vehicle at Step S11. While the vehicle is traveling downhill, the electrical motor generator M is driven by the driving force of the drive wheels to recover energy (i.e., to generate electricity). Here, the energy recovery rate E is a function of the vehicle speed V, so the value for the requested output is set, for example, as shown by real line Er in FIG. 6. In other words, the electrical motor generator M is capable of providing an electrical output that corresponds to real line Er. In FIG. 6, the energy recovery rate is described as negative values, so the larger the absolute value, greater the energy recovery rate E. However, the electrical motor generator M sometimes fails to provide the requested output Er if the electrical motor generator M and the battery B are affected, for example, by an ambient temperature or a malfunction. In this case, the torque driving the electrical motor generator M for energy recovery, i.e., the recovery torque, becomes smaller. As a result, the action of engine brake from the energy recovery is not achieved sufficiently in an expected way.

To solve this problem, a detection is made for a real energy recovery output (electric power for generation) Ea at Step S12, and the difference θE between the requested output Er and the actual output Ea is calculated at Step S13. Then, the size of the difference θE is determined at Step S14 and at Step S15. More specifically, as shown in FIG. 6, within the area defined by the requested output Er, which is determined in correspondence to the vehicle speed V, a first determination output line Ea1 and a second determination output line Ea2 are defined to divide the area into A zone, B zone and C zone.

The steps executed at Step S14 and at Step S15 determine which zone the actual output Ea at the current vehicle speed V is in, and if it is in the B zone, then a first step correction is performed at Step S17, or if it is in the C zone, then a second step correction is performed at Step S16. If the actual output Ea is in the A zone, then no correction is executed because it is substantially close to the requested output. In the first step correction, the target engine rotational speed Neo is raised by a fist predetermined value, and in the second step correction, the target engine rotational speed Neo is raised by a second predetermined value, which is larger than the fist predetermined value. Instead of correcting the target engine rotational speed by this zoning, the correction value may be adjusted correspondingly to the change of the difference θE, i.e., if the difference θE becomes larger, then the correction value also becomes larger.

After the target engine rotational speed Neo is corrected in this way, the control flow returns to Step S5, where the speed ratio control of the transmission is performed to bring the actual rotational speed of the engine to the target engine rotational speed Neo.

By this control, in a case where the electrical motor generator M fails to perform an initial or expected performance, as the target engine rotational speed is corrected to increase, the speed change ratio of the transmission is adjusted to the LOW speed ratio side. In this way, the force of the engine brake is increased as the rotational speed of the engine is increased. Therefore, even while the vehicle is traveling downhill with the electrical motor generator M not providing an original performance, as the control system adjusts the speed change ratio of the transmission to the LOW speed ratio side to increase the engine rotational speed, the engine brake is achieved securely and sufficiently.

The above embodiment of control system according to the present invention is described for a case where the vehicle is in a deceleration. In addition to this, a case where the vehicle is in an acceleration can be handled similarly by correcting the target engine rotational speed to increase in correspondence to the difference between the requested output and the actual output of the electrical motor generator. In this way, the driving force necessary for the acceleration is secured without any insufficiency. Also, the above embodiment is described in relation to a continuously variable transmission that incorporates a metal V-belt mechanism 10. Instead, another type of continuously variable transmission or a gear-type automatic transmission may be also controlled to achieve the same effect by a control system according to the present invention.

As described above, according to the present invention, for example, while the vehicle is traveling downhill with an engine brake, if the actual output (electrical power for recovering energy) of the electrical motor generator falls short of a requested output, the speed change ratio of the transmission is corrected (generally toward the LOW speed ratio side) in correspondence to the difference between the requested output and the actual output. As a result, the rotational speed of the engine and that of the electrical motor generator increase to increase the action of the engine brake accordingly, eliminating the insufficiency in the engine-braking action. On the other hand, while the vehicle is accelerating, if the actual output (electrical power for acceleration) of the electrical motor generator falls short, the speed change ratio is corrected (also toward the LOW speed ratio side) in correspondence to the difference between the requested output and the actual output. As a result, the driving torque is increased, eliminating the shortage in the driving force for the acceleration.

The control system according to the present invention is applied to an automatic transmission comprising a continuously variable transmission, whose speed change ratio is variable continuously without any step. In this case, the control system sets a target engine rotational speed in correspondence to the traveling condition of the vehicle and controls the continuously variable transmission to achieve this target rotational speed of the engine. Additionally, in response to the difference between the requested output and the actual output of the electrical motor generator, the control system corrects the target engine rotational speed and the speed change ratio to achieve this corrected target rotational speed.

Preferably, the control system further comprises inclination-detecting means, which is used to detect the inclination of the road surface. While the vehicle is traveling, if the control system detects that the road surface is sloped downward by the inclination-detecting means, then the control system corrects the speed change ratio in correspondence to the difference between the actual output of the electrical motor generator and the requested output of the electrical motor generator that is set correspondingly to the current speed of the vehicle. By this control, any insufficiency which may occur in the output of the electrical motor generator is compensated as the correction of the speed change ratio functions to increase the rotational speeds of the electrical motor generator and the engine, generating a force sufficient to eliminate the insufficiency in the engine-braking action.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2001-375646 filed on Dec. 10, 2001 which is incorporated herein by reference.

What is claimed is:

1. A vehicular power transmission control system for a vehicle, the power transmission control system comprising an engine, an electrical motor generator, a continuously variable transmission that transmits a rotational driving force of said engine and/or said electrical motor generator to wheels with a continuously variable speed change ratio, and inclination-detecting means for detecting an inclination of a road surface where the vehicle is traveling, wherein a target engine rotational speed is set based on an operational condition of the vehicle, and the speed change ratio of the continuously variable transmission is controlled so that a rotational speed of said engine approaches the target engine rotational speed, wherein the target engine rotational speed is corrected based on a difference $\Delta E$ between an actual output and a requested output of the electrical motor generator, wherein the target engine rotational speed becomes higher as said difference $\Delta E$ becomes larger, wherein, if the vehicle is traveling downhill, the electrical motor generator is driven by a force from the vehicle's wheels, and the speed change ratio is corrected based on the difference $\Delta E$, wherein the requested output is equal to a requested energy recovery output Er that is to be generated by the electrical motor generator when the vehicle is traveling downhill, and wherein the actual output is equal to an actual energy recovery output Ea that is generated by the electrical motor generator, and wherein each of a plurality of correction values is associated, respectively, with a different range of possible values for the difference $\Delta E$, and one of the correction values is selected for correcting the target engine rotational speed based on the range in which the difference $\Delta E$ falls and a current vehicle speed V.

2. The vehicular power transmission control system as set forth in claim 1, wherein:

said electrical motor generator assists the driving force of said engine such that said engine can operate in a range which is most fuel-efficient;

said electrical motor generator recovers energy from a driving force of said wheels during a deceleration of said vehicle; and said electrical motor generator assists a braking force by increasing an energy recovery rate when a brake is activated during the deceleration.

3. The vehicular power transmission control system as set forth in claim 1, wherein:

said engine comprises a plurality of cylinder bores with suction and exhaust valves and an fuel injection and ignition controller, whose operation is controllable; and said engine is capable of being operated in a partial cylinder operation mode, in which said suction and exhaust valves of some or all of said cylinder bores are set closed and controlled not to receive any fuel injection and ignition.

4. The vehicular power transmission control system as set forth in claim 1, wherein:

a vehicle speed and an accelerator opening are used as indications of the operational condition of said vehicle; and said target engine rotational speed is set in correspondence to said vehicle speed and said accelerator opening.

5. The vehicular power transmission control system as set forth in claim 1, wherein:

said requested output is a value that becomes larger as said vehicle speed becomes higher.

6. The vehicular power transmission control system as set forth in claim 1, wherein:

said actual output is smaller than said requested output; and if the difference between said actual output and said requested output is larger, said speed change ratio is adjusted closer to a LOW speed ratio side.

* * * * *